(No Model.)
J. T. TAYLOR.
TIRE ADJUSTER.
No. 573,310. Patented Dec. 15, 1896.
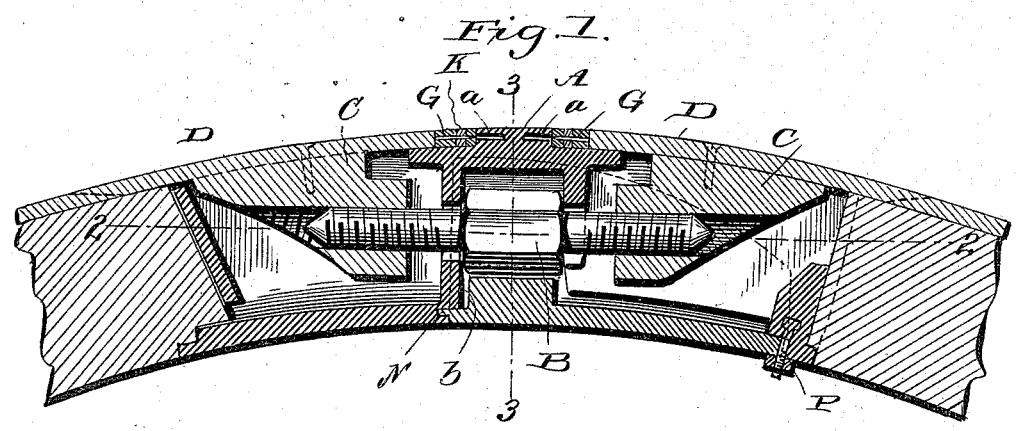
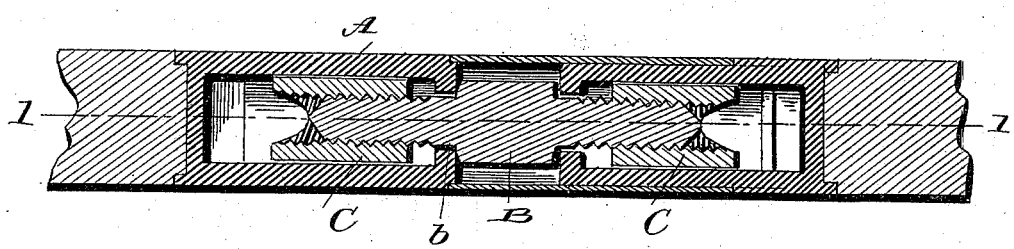
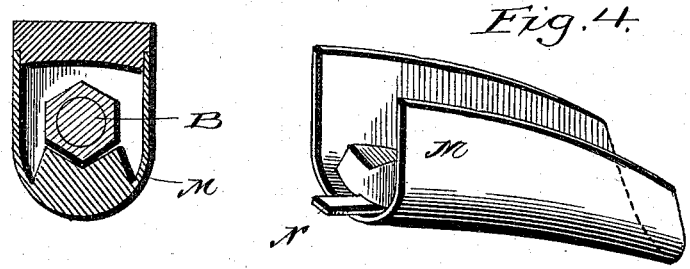
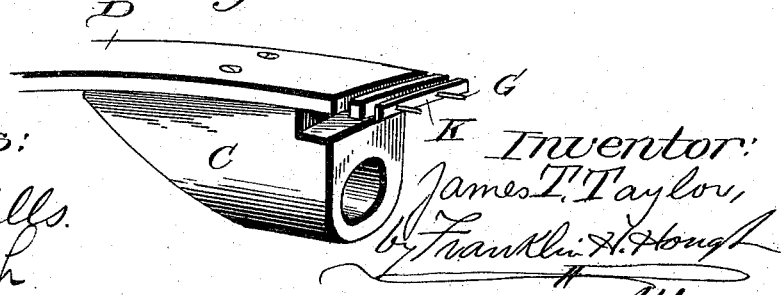
Witnesses:
L. C. Hills.
A. L. Hough.
Inventor:
James T. Taylor,
by Franklin H. Hough
Atty.

UNITED STATES PATENT OFFICE.

JAMES THOMAS TAYLOR, OF SEVERY, KANSAS, ASSIGNOR OF ONE-HALF TO SARAH F. NEWTON, JOHN T. MORGAN, WILLIAM F. MORGAN, JACKSON L. RADER, AND JOHN C. F. RABURN, OF SAME PLACE.

TIRE-ADJUSTER.

SPECIFICATION forming part of Letters Patent No. 573,310, dated December 15, 1896.

Application filed March 27, 1896. Serial No. 585,096. (No model.)

*To all whom it may concern:*

Be it known that I, JAMES THOMAS TAYLOR, a citizen of the United States, residing at Severy, in the county of Greenwood and State of Kansas, have invented certain new and useful Improvements in Tire-Adjusters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in tire-adjusters, and especially to a device by which the tire may be tightened or loosened by means of an adjusting-screw, and the provision of means for holding the tire at a certain tension by the use of small section-plates, which are held on dowels between the ends of the tightener, to which are welded the ends of the tire.

A further purpose of my invention is to produce a felly-piece containing a right-and-left screw, which is adapted to actuate blocks working within the felly-piece, and which blocks carry sections of metal, to which the ends of the tire are welded, after which the tire may be adjusted by turning the double-acting screw, as will be readily understood.

To these ends and to such others as the invention may pertain the same consists, further, in the novel construction, combination, and adaptation of the parts, as will be hereinafter more fully described and then specifically defined in the appended claim.

I clearly illustrate my invention in the accompanying drawings, which, with the letters of reference marked thereon, form a part of this specification, and in which drawings similar letters of reference indicate like parts throughout the several views, in which—

Figure 1 is a central vertical section through my improved tire-adjuster. Fig. 2 is a view on line 2 2 of Fig. 1. Fig. 3 is a cross-sectional view on line 3 3 of Fig. 1. Fig. 4 is an enlarged detail view of a plate inclosing one portion of the adjusting-screw. Fig. 5 is a detail in perspective of one of the adjusting-blocks.

Reference now being had to the details of the drawings by letter, A designates the felly-piece, in which is mounted the right and left handed screw B, having bearings in apertures $b$ in the said piece A. Mounted within the felly-piece, on either side of the center, is a block C in a suitable recess, and D D are sections of tire metal secured to the said blocks C, and the said blocks are designed to work backward and forward on the turning or adjusting screw B. The outer ends of the tire-pieces are welded at any suitable place, as at E, to the tire which is to be adjusted, and G G are dowels secured to or integral with the adjacent ends of the plates D. On the said dowels are carried the section-plates K, and $a$ are holes in which the dowels may register as the ends of the tire are brought together.

M is a plate which is held to the felly-piece by the lug N being inserted in the recess in the lower portion of the said felly-piece, the opposite end of the plate M being held in place by the screw P, provided with a suitable tightening-nut. A projecting portion Q of the plate M conforms in shape to the two of the hexagonal sides of the adjusting-screw, so that when the plate is locked in place the adjusting-screw will not be able to turn in either direction.

The adjustment of the device is as follows: When the tire of the wheel needs tightening or adjusting, as with varying conditions of weather, a section of the felly of the wheel and tire are cut away and the felly-piece inserted in the space thus formed between the ends of the tire and felly of the wheel. The ends of the tire of the wheel are welded to the metallic plates D, and by turning the adjusting-screw the ends of the tire may be brought nearer together, and by the use of the section-plates K the size of the tire may be regulated. When the tire has been properly adjusted, the shell or plate M may be locked in place and the tire will be securely held tight.

Having thus described my invention, what I claim to be new, and desire to secure by Letters Patent, is—

In a tire-tightener, the combination with the felly-piece A, a right-and-left tightening-screw carried therein, the blocks C, to which the tires are secured, mounted on the threaded ends of said screw, recesses in the upper portions of said blocks adapted to receive projections of the felly-piece, the filling-pieces carried on dowels, and the casing or plate M having a projection N designed to be seated in a recess in the felly-piece, and means for holding the said plate in place, and the said screw from turning, all substantially as shown and described.

In testimony whereof I affix my signature in presence of two witnesses.

JAMES THOMAS TAYLOR.

Witnesses:
W. F. MORGAN,
J. S. EMBLETON.